United States Patent [19]

Siegel et al.

[11] Patent Number: 4,567,464
[45] Date of Patent: Jan. 28, 1986

[54] FIXED RATE CONSTRAINED CHANNEL CODE GENERATING AND RECOVERY METHOD AND MEANS HAVING SPECTRAL NULLS FOR PILOT SIGNAL INSERTION

[75] Inventors: Paul H. Siegel, Palo Alto, Calif.; Stephen J. Todd, Winchester, United Kingdom

[73] Assignee: International Business Machines Corporation, Armonk, N.Y.

[21] Appl. No.: 461,842

[22] Filed: Jan. 28, 1983

[51] Int. Cl.$^4$ ............................................. H03K 13/24
[52] U.S. Cl. ................................ 340/347 DD; 370/98
[58] Field of Search ................. 340/347 DD; 235/310, 235/311; 360/40; 375/122, 110; 370/74, 98; 371/40, 45

[56] References Cited

U.S. PATENT DOCUMENTS

| | | | |
|---|---|---|---|
| 3,133,280 | 5/1964 | Crater | 340/347 DD |
| 3,508,197 | 4/1970 | Tong | 371/45 |
| 3,689,899 | 9/1972 | Franaszek | 340/347 DD |
| 4,028,535 | 6/1977 | Franaszek et al. | 235/152 |
| 4,122,440 | 10/1978 | Langdon et al. | 340/347 DD |
| 4,330,799 | 5/1982 | Price | 360/40 |
| 4,488,143 | 12/1984 | Martin | 340/347 DD |

OTHER PUBLICATIONS

Franaszek, "Sequence State Methods for Run Length Limited Coding", IBM Journal of Research & Development, pp. 376–383, Jul. 1970.

Primary Examiner—Charles D. Miller
Attorney, Agent, or Firm—R. Bruce Brodie

[57] ABSTRACT

The generation of NRZ representations of RLL encoded datastreams utilizes a length oriented arithmetically recursive RLL encoder whose finite state encoding transition space has assigned RLL symbols to state transitions. By constraining the paths, and hence restricting the set of allowable RLL symbol streams, then selectable notch frequencies in the spectra of the NRZ representation can be secured. Recovery of data is obtained by the logical dual of this process. Also, a NRZ bit stream representation exhibits a frequency spectrum notched at f/kn Hertz if k NRZ source codestreams are k-way interleaved.

4 Claims, 24 Drawing Figures

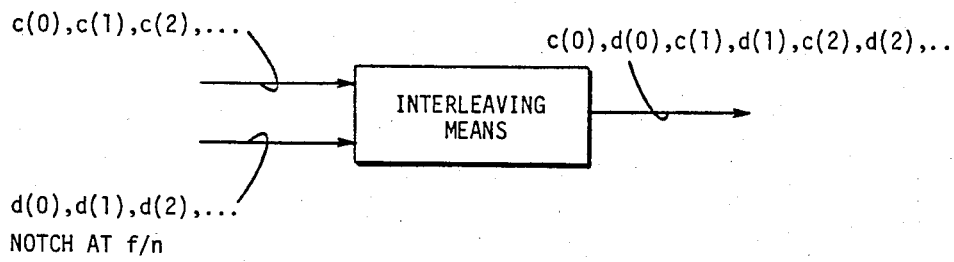

NOTCH AT f/n

FOURIER COMPONENTS OF INPUT SEQUENCES
S(f/njN)        S(f/njN)

$$\left| \sum_{k=0}^{N} c(k) e^{-j2\pi k/n} \right| \leq B; \text{ and } \left| \sum_{k=0}^{N} d(k) e^{-j2\pi k/n} \right| \leq B$$

$$\left| S(f/2nj2N+1) \right| = \left| \underbrace{\sum_{k=0}^{N} c(k) e^{-j2\pi k/n}}_{\substack{\text{FOURIER SPECTRAL} \\ \text{COMPONENTS IN EVEN} \\ \text{POSITIONS ARE FROM} \\ \text{DATASTREAM c}}} + \underbrace{\sum_{k=0}^{N} d(k) e^{-j2\pi (k+1)/n}}_{\substack{\text{FOURIER SPECTRAL} \\ \text{COMPONENTS IN ODD} \\ \text{POSITIONS ARE FROM} \\ \text{DATASTREAM d}}} \right|$$

$$\left| S((n-1)f/njN) \right| = \left| \sum_{k=0}^{N} c(k) e^{-j2\pi k/n} \right| = \left| S(f/njN) \right| \leq B$$

$$e^{j2\pi k/n} = e^{j2\pi r/n} \text{ where } r \equiv k \text{ modulo } n$$

GOVERNS HIGH ORDER INTERLEAVING

FIG. 3

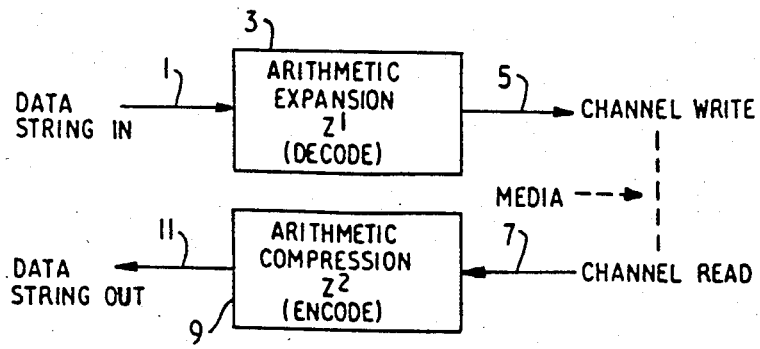
FIG. 4 APPLICATION OF ARITHMETIC CODING TO A CONSTRAINTED CHANNEL
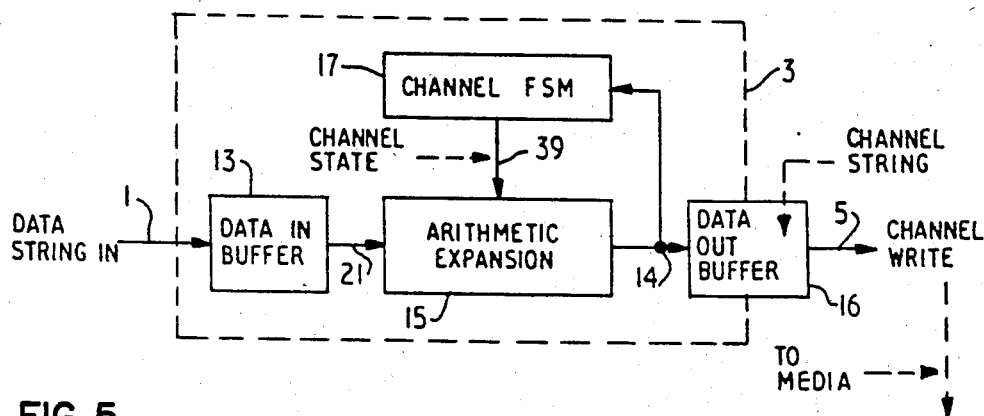
FIG. 5 BLOCK DIAGRAM FOR GENERATING CHANNEL STRING
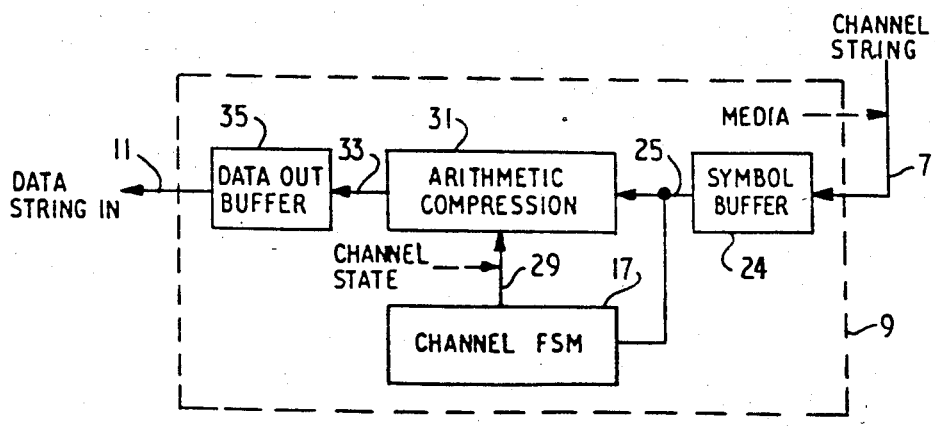
FIG. 6 BLOCK DIAGRAM DATA STRING RECOVERY

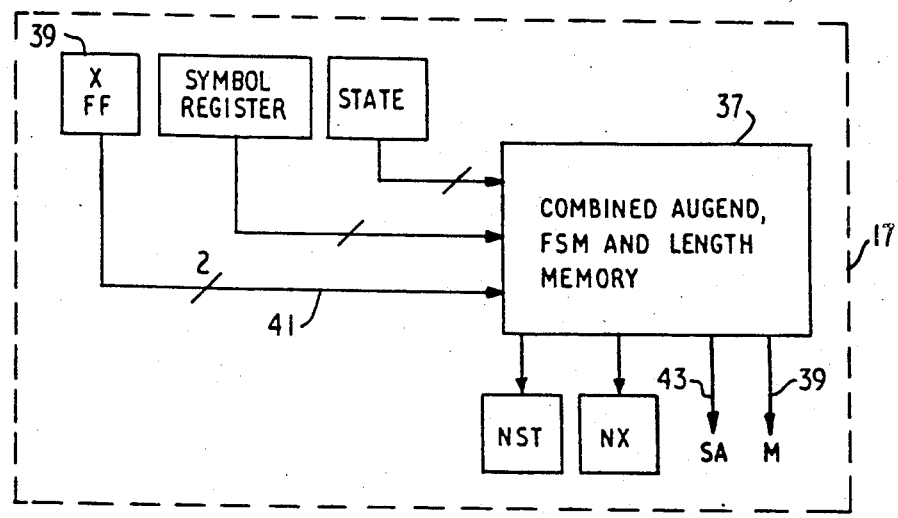
FIG. 7 AUGEND MEMORY WITH CHANNEL FSM AND LENGTH RECURSION
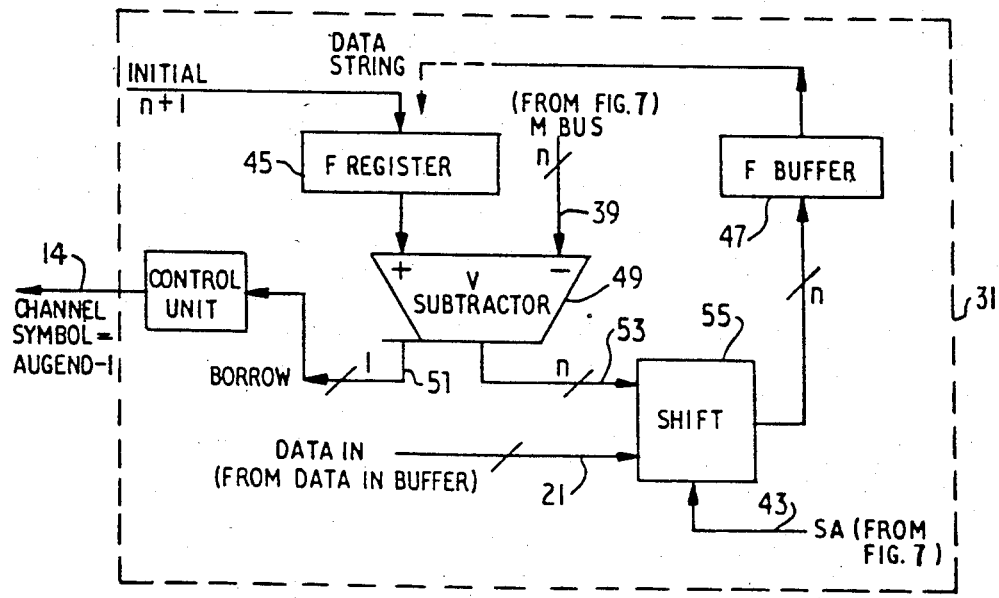
FIG. 8 DATA FLOW FOR CHANNEL STRING GENERATION

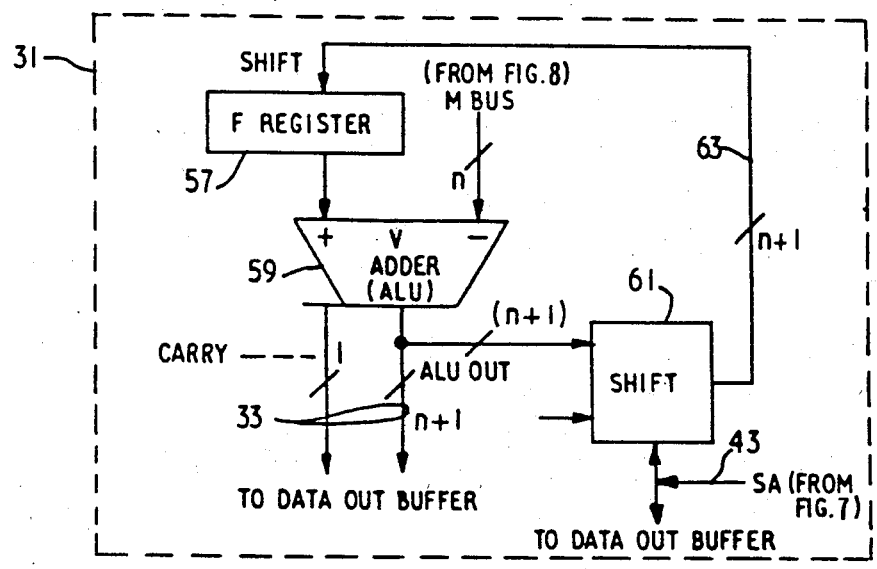
FIG. 9 DATA FLOW FOR DATA STRING RECOVERY
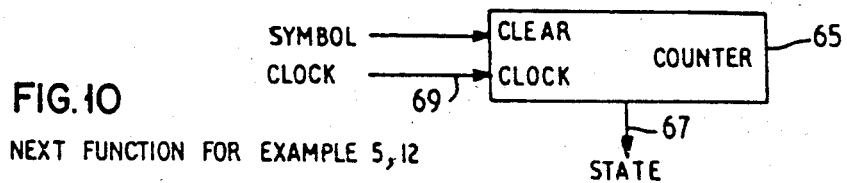
FIG. 10 NEXT FUNCTION FOR EXAMPLE 5,12
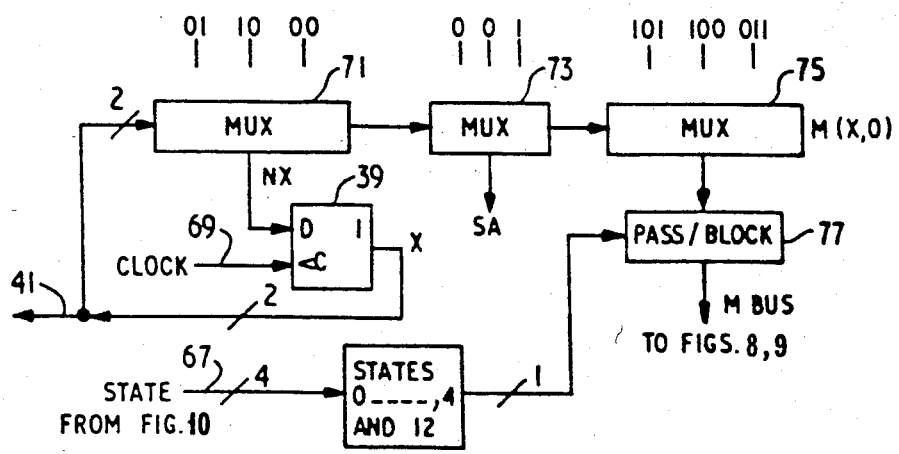
FIG. 11 IMPLEMENTATION OF NEXT x, SHIFT AND AUGEND M

APL MICROPROCESSOR RLL ENCODER/DECODER EQUIVALENT f2 NOTCH FINITE STATE TRANSITION DIAGRAM (FTSD)

f4 NOTCH LATTICE IN COMPLEX PLANE - STATES LABELLED WITH COMPLEX NUMBERS

| FROM \ TO | $S_1$ | $S_2$ | $S_3$ | $S_4$ | $S_5$ | $S_6$ | |
|---|---|---|---|---|---|---|---|
| $S_1$ |   | +1 |   |   | −1 |   | $S_1 = (0,1,0)$ |
| $S_2$ |   |   | −1 |   |   |   | $S_2 = (1,0,1)$ |
| $S_3$ |   |   |   | −1 |   | +1 | $S_3 = (0,1,0)$ |
| $S_4$ | +1 |   |   |   |   |   | $S_4 = (-1,0,1)$ |
| $S_5$ | −1 |   |   |   |   |   | $S_5 = (1,0,1)$ |
| $S_6$ |   |   | +1 |   |   |   | $S_6 = (-1,0,-1)$ |

TRANSITION MATRIX FOR 6-STATE F S T D

FIG. 16

| FROM \ TO | $S_1$ | $S_2$ | $S_3$ | $S_4$ | $S_5$ | $S_6$ |
|---|---|---|---|---|---|---|
| $S_1$ | | 5 | 6 | 7 | | |
| $S_2$ | | 4 | 5 | 6 | | |
| $S_3$ | 4,6,8 | | | | 3,5,7 | |
| $S_4$ | | 6 | 7 | 8 | | |
| $S_5$ | | | | | | 6 |
| $S_6$ | 3,5,7 | | | | 4,6,8 | |

$S_1 = (0,1,0)$
$S_2 = (1,0,-1)$
$S_3 = (0,-1,0)$
$S_4 = (-1,0,1)$
$S_5 = (1,0,1)$
$S_6 = (-1,0,-1)$

TRANSITION MATRIX FOR (2,7) CODE BASED ON 6-STATE FSTD
MATRIX ENTRIES ARE RUN-LENGTHS

FIG. 17

| FROM \ TO | $S_1^*$ | $S_2$ | $S_3^*$ | $S_4$ |
|---|---|---|---|---|
| $S_1^*$ | | 5 | 6 | 7 |
| $S_2$ | | 4 | 5 | 6 |
| $S_3^*$ | 3,4,5,6,7,8 | | | |
| $S_4$ | | 6 | 7 | 8 |

$S_1^* = S_1$ and $S_5$ IDENTIFIED $S_3^* = S_3$ and $S_6$ IDENTIFIED

REDUCED TRANSITION MATRIX
MATRIX ENTRIES ARE RUN LENGTHS

FIG. 18

19 STATES FOR f/6 WITHIN RADIUS 2 OF ORIGIN $$C = \log_2 W = \log_2 1.26135$$
$$= .33497$$
$$B = [.3964, .5, .7166, .3143]$$

TST

| STATE \ SYMBOL | 1 | 2 | 3 | 4 | 5 | 6 | 7 | 8 |
|---|---|---|---|---|---|---|---|---|
| 0 | 0 | 0 | 0 | 0 | 0 | 0 | 0 | 0 |
| $S_{16}$ | 0 | 0 | 0 | 0 | $S_{17}$ | $S_{18}$ | $S_{19}$ | 0 |
| $S_{17}$ | 0 | 0 | 0 | $S_{17}$ | $S_{18}$ | $S_{19}$ | 0 | 0 |
| $S_{18}$ | 0 | 0 | $S_{16}$ | $S_{16}$ | $S_{16}$ | $S_{16}$ | $S_{16}$ | $S_{16}$ |
| $S_{19}$ | 0 | 0 | 0 | 0 | 0 | $S_{17}$ | $S_{18}$ | $S_{19}$ |

→

| 0 | 0 | 0 | 0 | 0 | 0 | 0 | 0 |
|---|---|---|---|---|---|---|---|
| 0 | 0 | 0 | 0 | 2 | 3 | 4 | 0 |
| 0 | 0 | 0 | 2 | 3 | 4 | 0 | 0 |
| 0 | 0 | 1 | 1 | 1 | 1 | 1 | 1 |
| 0 | 0 | 0 | 0 | 0 | 2 | 3 | 4 |

MJX

| STATE \ X | 0 | 1 | 2 |
|---|---|---|---|
| 0 | 0 | 0 | 0 |
| $S_{16}$ | 101 | 80 | 63 |
| $S_{17}$ | 128 | 101 | 80 |
| $S_{18}$ | 183 | 145 | 115 |
| $S_{19}$ | 80 | 63 | 50 |

NOTCH ENCODER / DECODER TABLES

FIG. 21

```
     ∇ CDATA←PARAM ENCODE DATA;N;C;K;S
[1]   ⍝
[2]   ⍝ ENCODER FOR ARITHMETIC (D,K) CODE WITH
[3]   ⍝ SPECTRAL NOTCH AT F/6.
[4]   ⍝
[5]   ⍝ PARAM IS 2-VECTOR CONTAINING N AND C.
[6]   ⍝ DATA IS A BINARY DATA STREAM (0'S AND 1'S).
[7]   ⍝
[8]   ⍝ GLOBAL VARIABLES REQUIRED ARE:
[9]   ⍝             MJX  -   TALBLE OF M ADDEND VALUES
[10]  ⍝             TST  -   MODIFIED TRANSITION MATRIX
[11]  ⍝             LREG -   THE SHIFT REGISTER LENGTH IN BITS
[12]  ⍝ INITIALIZE
[13]   X←N←PARAM[1]
[14]   C←PARAM[2]
[15]   'CODE PARAMS = ',⍕PARAM
[16]   S←1
[17]   K←0
[18]  ⍝ ADD LREG 0'S TO FRONT OF DATA, Q DUMMY 1'S TO TAIL
[19]   Q←LREG
[20]   DATA←(LREGρ0),DATA,Qρ1
[21]   CDATA←0/1
[22]   TOTSHIFT←0
[23]   (23ρ' '),('N=',⍕K),(' X=',⍕X),' ',(⍕DATA[⍳LREG]),' ',(⍕10↑LREG↓DATA)
[24]  ⍝ OUTPUT BIT = 0
[25]  ZERO:
[26]   F←2⊥DATA[⍳LREG]
[27]   (30ρ' '),' ',(⍕(LREGρ2)⊤(MJX[1+TST[(1+S);1+K];1+X]))
[28]   →(F<(MJX[1+TST[(1+S);1+K];1+X]))/ONE
[29]   CDATA←CDATA,0
[30]   ((2×(10-(10⌊ρCDATA)))ρ' '),(⍕(-10⌊ρCDATA)↑CDATA)
[31]   DATA[⍳LREG]←(LREGρ2)⊤F←F-(MJX[1+TST[(1+S);1+K];1+X])
[32]   K←K+1
[33]   →ADDX
[34]  ⍝ OUTPUT BIT = 1
[35]  ONE:
[36]  ⍝'BIT=1'
[37]   CDATA←CDATA,1
[38]   ((2×(10-(10⌊ρCDATA)))ρ' '),(⍕(-10⌊ρCDATA)↑CDATA)
[39]   S←TST[(1+S);1+K]
[40]   K←0
[41]  ⍝ INCREMENT RETAINED FRACTION COUNTER X
[42]  ⍝ SHIFT THE REGISTER IF INCREMENT CAUSES
[43]  ⍝ A CARRY MODULO C
[44]  ADDX:
[45]   (30ρ' '),' ',(⍕DATA[⍳LREG]),' ',(⍕10↑LREG↓DATA)
[46]   SHIFT←⌊(X+N)÷C
[47]   X←(C|X+N)
[48]   DATA←SHIFT⌽DATA
[49]   2 1 ρ' '
[50]   (23ρ' '),('N=',⍕K),(' X=',⍕X),' ',(⍕DATA[⍳LREG]),' ',(⍕10↑LREG↓DATA)
[51]   TOTSHIFT←TOTSHIFT+SHIFT
[52]   →(TOTSHIFT≤(ρDATA)-LREG)/ZERO
    ∇ 16:03:46 12/06/82    << 1001 RLLWS >>
```

FIG. 22

```
    ∇ DATA←PARAM DECODE CDATA;N;C;K;S
[1]   ⍝ DECODER FOR ARITHMETIC (D,K) CODE WITH
[2]   ⍝ SPECTRAL NOTCH AT F/6.
[3]   ⍝ INITIALIZE
[4]    X←N←PARAM[1]
[5]    C←PARAM[2]
[6]    S←1
[7]    K←0
[8]    F←0
[9]    DATA←0/1
[10]   TOTSHIFT←0
[11]   ((2×(10-(10⌊⍴DATA)))⍴' '),(⍕(-10⌊⍴DATA)↑DATA),((2-(0=⍴DATA))⍴' '),(⍕(
       LREG⍴2)⊤F),' N=',(⍕K),' X=',⍕X
[12]  ⍝ INPUT BIT = 0
[13]  ZERO:
[14]   (20⍴' '),' ',((2×LREG)⍴' '),(⍕CDATA[1]),'   ',(⍕10↑1↓CDATA)
[15]   →(CDATA[1]≠0)/ONE
[16]   F←F+MJX[1+TST[(1+S);1+K];1+X]
[17]   (19⍴' '),' ',⍕(LREG⍴2)⊤MJX[1+TST[(1+S);1+K];1+X]
[18]  ⍝ CHECK FOR OVERFLOW
[19]   →((LF÷(2×LREG))=0)/INCK
[20]   DATA←((-25⌊⍴DATA)↓DATA),((25⌊⍴DATA)⍴2)⊤(2⊥-(-25⌊⍴DATA)↑DATA)+1
[21]   F←((2×LREG)|F)
[22]  INCK:
[23]   K←K+1
[24]   →ADDX
[25]  ⍝ INPUT BIT = 1
[26]  ONE:
[27]   S←TST[(1+S);1+K]
[28]   K←0
[29]   (19⍴' '),' ',(2×LREG)⍴'X '
[30]  ⍝ INCREMENT RETAINED FRACTION COUNTER X
[31]  ⍝ AND SHIFT WHEN INCREMENT CAUSES A
[32]  ⍝ CARRY MODULO C.
[33]  ADDX:
[34]   ((2×(10-(10⌊⍴DATA)))⍴' '),(⍕(-10⌊⍴DATA)↑DATA),((2-(0=⍴DATA))⍴' '),⍕(
       LREG⍴2)⊤F
[35]   SHIFT←⌊(X+N)÷C
[36]   X←(C|X+N)
[37]   DATA←DATA,SHIFT↑(LREG⍴2)⊤F
[38]   F←2⊥LREG↑(SHIFT↓(LREG⍴2)⊤F),0
[39]   2 1 ⍴' '
[40]   ((2×(10-(10⌊⍴DATA)))⍴' '),(⍕(-10⌊⍴DATA)↑DATA),((2-(0=⍴DATA))⍴' '),(⍕(
       LREG⍴2)⊤F),' N=',(⍕K),' X=',⍕X
[41]   CDATA←1⌽CDATA
[42]   TOTSHIFT←TOTSHIFT+1
[43]   →(TOTSHIFT<(⍴CDATA))/ZERO
[44]  ⍝ TRUNCATE LEADING 0'S AND TRAILING DUMMY BIT
[45]   DATA←LREG↓¯1↓DATA
    ∇ 16:18:09 12/06/82   << 1001 RLLWS >>
```

FIG. 23

FIXED RATE CONSTRAINED CHANNEL CODE GENERATING AND RECOVERY METHOD AND MEANS HAVING SPECTRAL NULLS FOR PILOT SIGNAL INSERTION

TECHNICAL FIELD

This invention relates to the generation and recovery of streams of symbols constrained according to a finite state machine description, and the symbol duration parameters, and more particularly, to run length limited codes having selectable frequency notches suitable for pilot signal insertion, as may be found in data transmission, magnetic recording, and the like.

BACKGROUND ART

Franaszek, U.S. Pat. No. 3,689,899, issued Sept. 5, 1972, described a method for increasing the density with which data could be recorded on disks, or which could be reliably transmitted through existing channels by a run length limited (RLL) coding technique. This technique converts an ordinary binary data stream into a sequence of ones spaced apart by a variable number of zeros. That is, each "1" in an ordinary binary data stream must be separated from the nearest adjacent "1" by a number of zeros at least equal to a minimum quantity d in order to assure freedom from inter-symbol interference during recording or transmission. However, the number of zeros cannot exceed a maximum number k which is required for self-clocking purposes. Such codes are referred to as (d,k) RLL codes. The coded information is processed in code groups or code words of variable lengths. The lengths of the encoded words bear a constant ratio (fixed rate) to the respective lengths of their corresponding original data words. Further, Franaszek in "Sequence State Methods for Run Length Limited Coding", IBM Journal of Research and Development, pp376–83, July 1970, teaches that a binary stream could be mapped into either a fixed rate or variable rate RLL code using either state-dependent or state independent transformations.

Guazzo, "A General Minimum Redundancy Source Coding Algorithm", IEEE Transactions on Information Theory, Vol. IT26, p1525, January 1980, described the mapping of source streams into a variable rate RLL symbol stream using a Huffman decoder. Recovery of the source stream was by way of applying the RLL symbol stream to a Huffman encoder. In this regard, the Huffman decoder expands the RLL stream relative to the data stream, while the encoder recovered the original stream by compression of the RLL stream.

The compression of bit streams by using a pair of recursions for arithmetically combining bit pairs of relatively shifted finite number streams is described by Rissanen and Langdon in "Arithmetic Coding", IBM Journal of Research and Development, Vol. 23, pp149–62, March 1979. Langdon's method utilizes two recursions. One recursion arithmetically combines an increment to a retained portion of the compressed codestream, while the second recursion controls the compressed stream's length increase. For purposes of completeness, it should be appreciated that arithmetic codes may be either probability oriented or length oriented. These are, for example, respectively described in Langdon, U.S. patent application Ser. No. 098,285, filed Nov. 28, 1979, and Langdon et al, U.S. Pat. No. 4,122,440, issued Oct. 24, 1978.

Martin, U.S. Pat. No. 4,488,143, issued Dec. 11, 1984, describes a method and means for generating a fixed rate RLL code from a data stream using a recursive process and recovering the original data from the encoded stream also by way of a recursive process. Martin's advance was based upon the critical observation that if a length oriented arithmetic decoder were constrained to ONE-TO-ONE map symbol streams in the data stream to RLL stream direction, and if a counterpart arithmetic encoder were constrained to ONTO map symbol streams in the RLL to data stream direction, then such measures would permit recursive code operations and preserve fixed rate property.

It is appreciated that constrained channel environments include recording information on moving magnetic media such as disk or tape. Recording information on such moving magnetic media requires transforming bit streams from an external information source into patterns which are compatible with the spectral characteristics of the recording medium. It is well known that the spectral characteristics of constrained channels or recording codes vary as a function of the distribution of ones and zeros that are recorded. For this reason, it was found desirable to include and exclude certain bit stream combinations. The Martin disclosure was premised upon inverting the order of a known compression technique. It was thus necessary for him to characterize the information as transformed by the compression systems. That is, if a bit stream from an information source was applied to a DASD recording channel, it would enter an arithmetic decoder. Insofar as the decoder was concerned, it would treat this bit stream as if it were a compressed bit stream. The decoder actually expands the bit stream length. It was this manipulation that permitted Martin to match a code to the presumed channel spectral characteristics. Thus, although Guazzo taught the use of an inverted Huffman decoder/encoder pair for generating by concatenation a variable rate RLL stream, Martin used ONE-TO-ONE and ONTO mappings in the appropriate transformation directions to perfect both a fixed rate RLL code and maintain representability.

Franaszek et al, U.S. Pat. No. 4,328,535, issued June 7, 1977, while describing the desirability of obtaining a frequency null as a fraction of the data clock frequency, achieved this by bounding the running sums of the Fourier components at the frequency to be suppressed. Franaszek taught adaptive adjustment by continuously monitoring decoder output and readjusting the translation selection as a function thereof.

THE INVENTION

The technical problem solved by this invention relates to a method for generating run length limited codes having selectable frequency notches suitable for pilot signal insertion as may be found in data transmission, magnetic recording and the like. It was first observed that k NON-RETURN TO ZERO (NRZ) codestreams, each having a frequency notch at f/N, f being the bit rate, could be transformed into a stream having a notch frequency at f/Nk by the step of k-way bit interleaving of said sources. However, the k-way interleaving destroyed the RLL (d, k) constraints due to the loss of control as to where polarity transitions in the resulting codestream would occur. By reformulating the k-way interleaving process for codes with a notch at f/2 as a k-dimensional finite state transition diagram, then the state transitions could be labeled with extended symbols (multiple bits). That is, instead of labeling a state transition with a plus 1 or a minus 1, state transitions could be labeled with multiple bit symbols. The patterns produced by moving from state to state along defined state transition paths guarantee preservation of a notch at f/2k and renders RLL character generation and recovery amenable to length oriented arithmetic stream coding. Thus, this invention, by labeling transitions in a lattice-shaped finite state transition diagram with extended symbols corresponding to permissible run lengths, then applying arithmetic coding techniques to produce tables of addends (augends), may be used to actually execute the RLL encoding/decoding.

The generation of NRZ representations of RLL encoded datastreams utilizes a length oriented arithmetically recursive RLL encoder whose finite state encoding transition space has assigned RLL symbols to state transitions. By constraining the paths, and hence restricting the set of allowable RLL symbol streams, then selectable notch frequencies in the spectra of the NRZ representation can be secured. Recovery of data is obtained by the logical dual of this process. Also, a NRZ bit stream representation exhibits a frequency spectrum notched at f/kn Hertz if k NRZ source codestreams, each having notch frequency f/n, are k-way interleaved. This is manifest as a ONE-TO-ONE mapping between a datastream set into a subset of all possible RLL symbol streams for channel encoding, and an ONTO mapping for channel decoding.

Significantly, while the Franaszek U.S. Pat. No. 4,328,535 teaches adaptive adjustment by continuously monitoring decoder output and readjusting the translation selection as a function thereof, the method of this invention permits f/2k notching orthogonal to the (d, k) constraints since the k factor is limited only by the dimension of the lattice-type finite state transition diagram. That is, a selectively notchable code can be generated by way of a method invoking only a table modification of a known type of constrained channel decoder.

BRIEF DESCRIPTION OF THE DRAWING

FIG. 3 shows the summed band limited Fourier components in a two-way interleaved bit stream.

FIGS. 4-11 show the use of arithmetic coding to expand a datastream for constrained channel transmission or recording and recover the original datastream by compressing out the expanded stream.

FIGS. 13-20 represent successively complex finite state transition diagrams which control the constrained channel coding and decoding action to achieve a selectable notch filter frequency f/nk.

FIG. 21 sets out illustrative tables used in the ROMs of the encoder/decoder embodiment depicted in FIGS. 4-11, and also used by the APL language processor executing on the IBMs 3033 set out in FIG. 12.

FIGS. 22 and 23 respectivey depict APL encoder and decoder functional programming equivalents executing upon an APL language processor in IBM 3033, or equivalent, for converting input bit streams into notched RLL expanded streams, and for extracting original streams from said expanded streams according to the invention.

DESCRIPTION OF THE PREFERRED EMBODIMENT and INDUSTRIAL APPLICABILITY

Preliminary Concerns

As previously mentioned, constrained channel coding involves expanding source bit streams by inserting patterns of ones and zeros therein which will alter the resulting spectrum to one pragmatic to the environment. Among the newer techniques for generating such expanded codes are those involving recursion as set forth in the copending Martin application. It should be appreciated that the prior art labeled transitions either as a zero or one, while arithmetic coding techniques permit a multiple bit labeling.

In this invention there will be described (1) the determination of notch frequency location; (2) the dimensioning of a lattice as a function of f/n; (3) generation of an arithmetic code to take the vertices of the higher dimensional lattice and connect them with transitions labeled by extended symbols so that the actual runs would be determined by the (d, k) constraints such as (2,7). Lastly, a specific encoding/decoding modality based on the transition diagram will be set forth.

It should be appreciated that an FSTD in the form of a hexagonal lattice is known to produce streams having a notch at F/6. The question arises as to the manner in which the FSTD may be combined with one run length constraint. Instead of labeling transitions with just a one or zero, (or +1, −1) the transitions are labeled with multiple bit symbols. Patterns are produced by moving from state to state along these transitions. Multi bits are generated since they can predetermined. This, then, guarantees the RLL constraints. That is, for (2,7) constraint the runs would be 001, . . . ,00000001. Next, a discussion of the characterization of the notch frequency spectrum.

In the copending Martin application, there is described a method and means for utilizing a fixed rate length based arithmetic code for a constrained channel where the constraints are described according to a finite state machine.

K-way Interleaving and Notch Frequency

Figure 1:
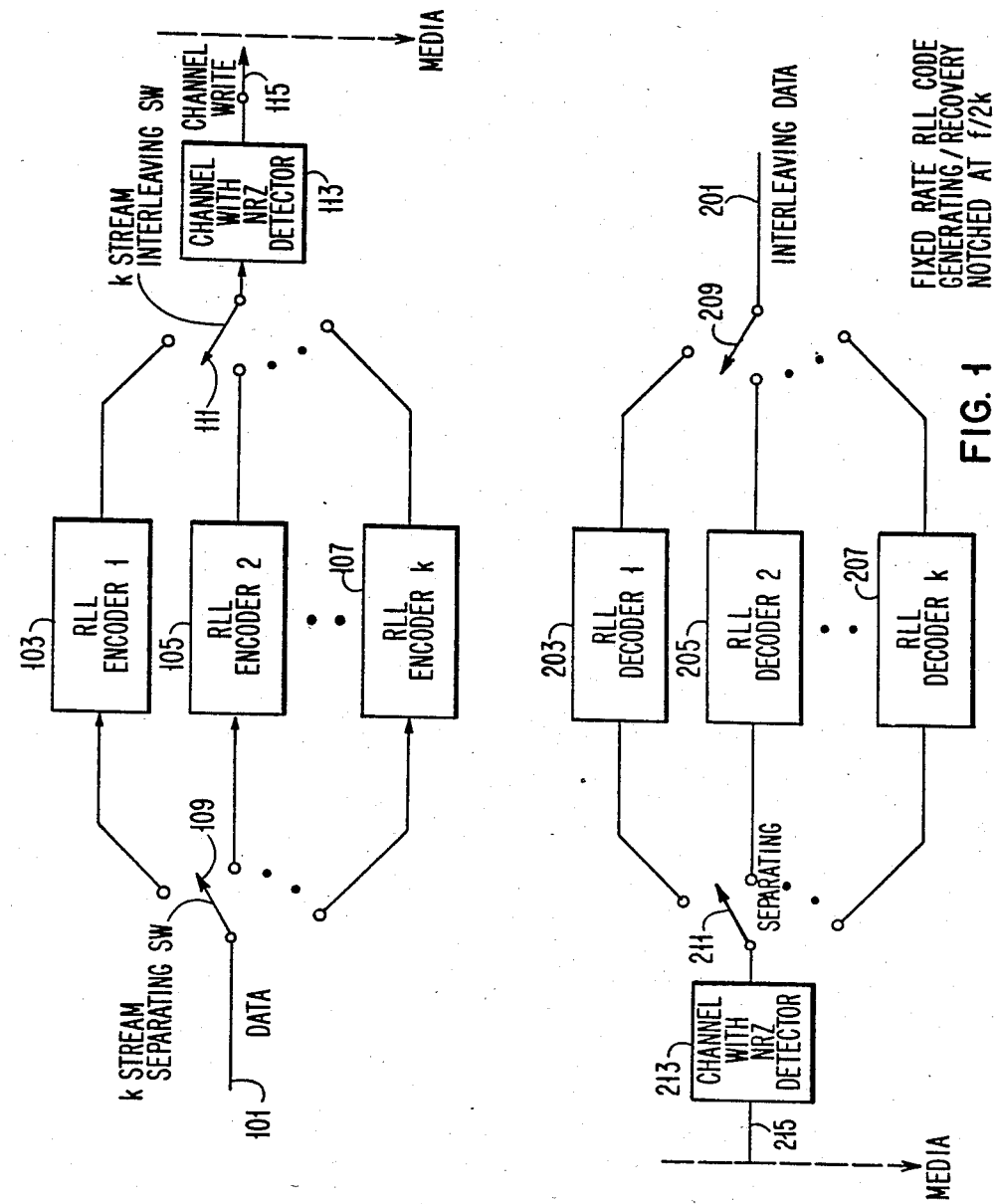
FIG. 1 depicts a k-way interleaving of k separate codestreams for creating a spectral null at f/2k, and for recovery of the k streams from such an interleaved stream.

Referring now to FIG. 1, there is shown a plurality of k run length limited encoders 103, 105 . . . 107 for interleave encoding a data bit stream applied thereto over path 101. Also shown is a plurality of k RLL decoders 203, 205 . . . 207 for separating and decoding an interleaved RLL bit stream for extracting the original data therefrom. This embodiment teaches that a k-way interleaving of k codestreams, each having a spectral notch at f/n, produces a codestream with a spectral notch at f/kn. The run length constraints of the component codestreams will not, in general, be preserved by interleaving. Each RLL encoder responsive to a bit will assign a variable length RLL stream. The respective outputs of the encoders 1, 2, k will be sampled by the interleaving switch 111, and applied to a k channel non-return-to-zero detector 113. This converts the bit stream into an appropriate analog waveform in which edges of transitions between voltage/current magnitudes cause magnetic flux spots to be recorded on a moving magnetic media such as tape or disk. Of course, a transmission path, rather than a recording channel, would likewise embody a suitable digital-to-analog converter. Recovery from the media or constrained channel is by way of a channel NRZ detector 213 which converts the analog variations to a digital bit stream. The stream is then separated by switch 211 and applied to counterpart RLL decoders 1, 2, ... k, (203, 205, 207). The decoder outputs are then interleaved by switch 209 and applied to output path 201.

Fourier Analysis of the K-way Interleave

Figure 2A:
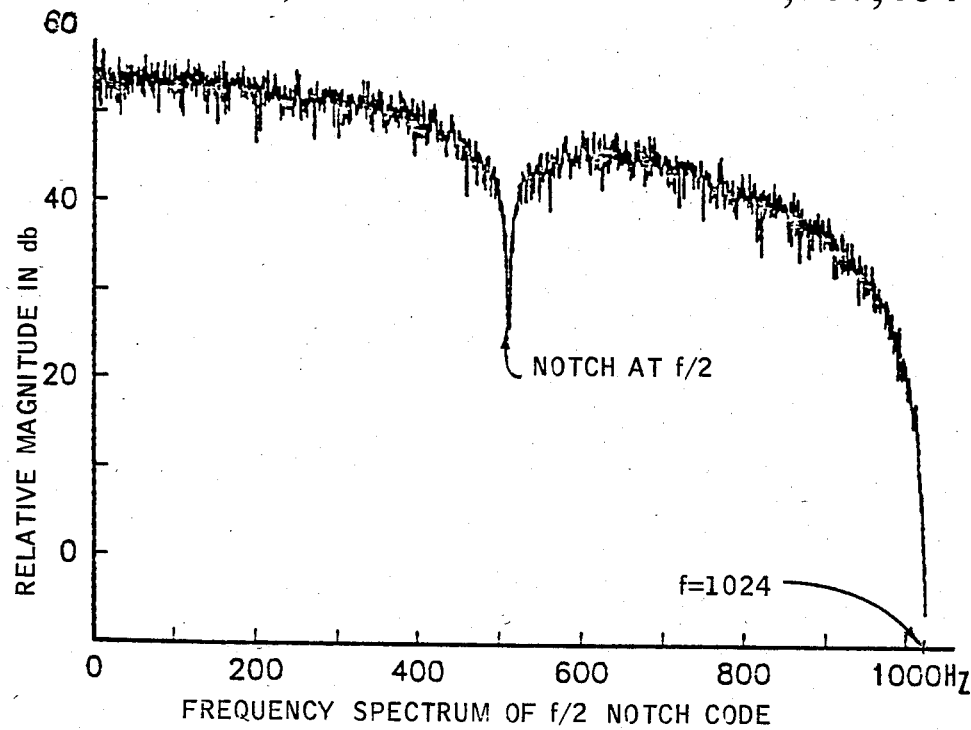
FIG. 2 shows the relative magnitude versus frequency spectrum of an interleaved bit stream with notches at rational number multiples of f/2.
Figure 2B:
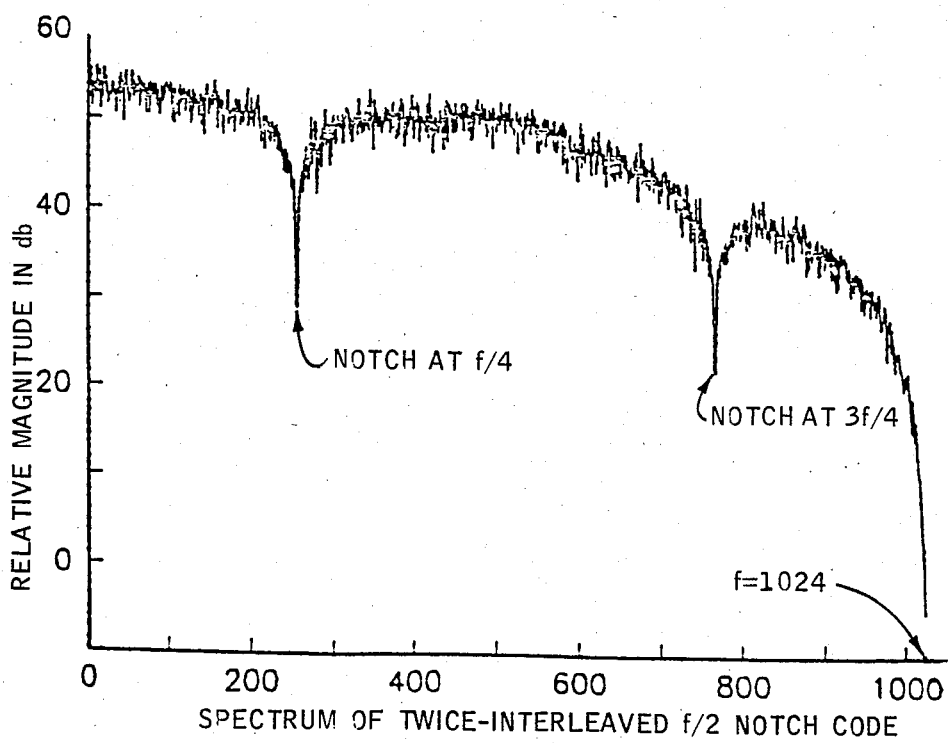

A typical relative magnitude versus frequency spectrum of a constrained channel bit stream is shown in FIG. 2. The upper spectrum depicts a notch at f/2, where f is the cutoff frequency. The lower spectrum sets out two notches at f/k2 where k is a rational number. The effect of inducing notches at f/kn can be explained as follows. If y and z are complex numbers, then insert $$|y+z| \leq |y| + |z|. \quad (1)$$

This stems from the observation that the length of any side of a triangle on a complex plane is less than the sum of the lengths of the remaining two sides.

Now, assume codestreams $c(0), c(1), c(2), \ldots$ and $d(0), d(1), d(2), \ldots$ have notches at frequency f/n. That is, their Fourier components S(f/n;N) at frequency f/n satisfy:

$$\left| \sum_{k=0}^{N} c(k) e^{-j2\pi k/n} \right| \leq B \quad (2)$$

and $$\left| \sum_{k=0}^{N} d(k) e^{-j2\pi k/n} \right| \leq B$$

Now, if the c and d codestreams are interleaved, the resulting stream $c(0), d(0), c(1), d(1), c(2), d(2), \ldots$ up to, say, 2N+2 symbols, has Fourier component S(f/2n;2N+1) at frequency f/2n given by:

$$S(f/2n; 2N+1) = \sum_{k=0}^{N} c(k) e^{\frac{-j2\pi(2k)}{2n}} + \sum_{k=0}^{N} d(k) e^{\frac{-j2\pi(1+2k)}{2n}} \quad (3)$$

symbols in even positions are from c symbols in odd positions are from d

For convenience, S(f/2n;2N+1) may be referenced as s(f/2n). To bound the modulus |S(f/2n)|, the triangle inequality is used where y is the first sum in (3) and z is the second sum. From (1) we get:

$$|S(f/2n)| = \left| \sum_{k=0}^{N} c(k) e^{\frac{-j2\pi(2k)}{2n}} \right| + \left| \sum_{k=0}^{N} d(k) e^{\frac{-j2\pi(1+2k)}{2n}} \right| \quad (4)$$

-continued $$= \left| \sum_{k=0}^{N} c(k) e^{\frac{-j2\pi k}{n}} \right| + \left| e^{\frac{-j2\pi}{2k}} \right| \cdot \left| \sum_{k=0}^{N} d(k) e^{\frac{-j2\pi k}{n}} \right|$$

In the right hand term, $e^{-j2\pi/2n}$ is factored out from all of the terms in the sum and uses the fact that if x and w are complex, then $$|x \cdot w| = |x| \cdot |w|$$

Since the modulus of $e^{-j2\pi/2n}$ is 1, then equations (2) and (4) are combined to conclude that the modulus of S(f/2n) is bounded, namely:

$$|S(f/2n)| \leq B + B = 2B \quad (5)$$

This holds for all values of N since (2) holds for all N, implying that the interleaved codestream has a notch at f/2n.

In higher order interleaving, mathematical induction is used to generalize the triangle inequality to more than 2 complex quantities:

$$|z(1) + z(2) + \ldots + z(k)| \leq |z(1)| + |z(2)| + \ldots + |z(k)|$$

A proof, very similar to the one above, shows that if k streams, each having Fourier component at f/n bounded in absolute value by B, are k-way interleaved, the merged stream has a Fourier component at f/kn which is bounded by kB.

Fourier Analysis of Higher Frequency Notches

The k-way interleaving of codestreams with a frequency notch at f/n as described above, may and often will produce notches at other frequencies in addition to f/kn. These pose no problem that require the use of filtering; they merely reflect the fact that the merged stream has little energy at these frequencies in addition to f/kn.

The notches could even be viewed as a benefit. That is, additional servo or other signals concentrated at these notch frequencies could be easily separated from the data signal (just as the servo at f/kn would be separated from the data on servo read/data, write, and data read).

The explanation of these extra notches is illuminated by the following argument:

Let S(f/n;B) be as above, the sum which gives the Fourier component at f/n for the codestream c(0),c(1), ... up to the symbol c(N). A notch at f/n is guaranteed by ensuring that the codestream satisfies:

$$|S(f/njN)| = \left| \sum_{k=0}^{N} c(k) e^{-j2\pi k/n} \right| \leq B \quad (6)$$

for some constant B, and all N greater than 0.

Examining the expression for the modulus of S((n−1)f/n; N).

$$|S((n-1)f/njN)| = |\overline{S(f/njN)}| \leq B$$

and taking into account (1) The modulus of a complex number is equal to the modulus of its complex conjugate.
(2) The complex conjugate of a product of complex numbers is equal to the product of the complex conjugates of the factors.

It follows that a notch at f/n produced in the described manner is always accompanied by a notch at (n−1)f/n. This accounts for the notch at 3f/4 in addition to the notch at f/4 shown in the disclosure. This also shows that any such notch at kf/n will be accompanied by a notch at (n−k)f/n.

Higher order interleaving produces further notches in general, and these can also be explained easily by applying simple facts from complex analysis. For example, interleaving two code sources with notches at frequency f/6 produces a merged codestream with frequency notches at f/12 and 11f/12, as expected, but also at 5f/12 and 7f/12.

To understand the occurrence of a notch at 5f/12, consider the expression for the modulus of S(5f/12) for the merged codestream as in (3) above. Using the fact that $$e^{j2\pi k/n} = e^{j2\pi r/n}$$

where r≡k modulo n it is apparent that the first sum is the same as the corresponding sum in S(11f/12), and the second sum is $e^{-j2\pi \cdot 6/12}$ times the corresponding sum in S(11f/12). It now follows, just as in equations (4) and (5) above, that the modulus of S(5f/12) is bounded by 2B, implying a notch at 5f/12.

Recursive Arithmetic Constrained Channel Coding

The copending Martin application shows how a fixed rate length based arithmetic code generating method and means can be applied to the coding of a constrained channel where the constraints are described by a finite state machine (FSM). In one type of constrained channel, that of saturation magnetic recording, the media is divided into channel time units. The events are the occurrence or nonoccurrence of a flux change, so the elementary symbols are said to consist of zeros and ones. The well-known run length limited (RLL) constraints are called (d,k) constraints when there must be at least d and no more than k zeros between successive ones. Codes for (d,k) constraints are used to maximize constraints on the channel and synchronize a clock, that is, provide self-clocking.

Referring now to FIG. 4, a datastream is applied on path 1 to a length oriented arithmetic decoder 3 which responds to the datastream as if it were the high to low position magnitude order bits of an arithmetically-compressed stream. The decoder expands the stream into the constrained form required by the (d,k) or other constraints suitable for recording or transmission. On playback, the RLL streams are applied over path 7 to an arithmetic encoder 9. Encoder 9 responds to the bit stream on path 7 as if it were an ordinary binary number stream to be reduced (compressed), and placed on output path 11. The arithmetic decoder and encoder are constrained so as to preserve a fixed rate constant length ratio between input and output, and to ensure that all datastreams can be represented by channel streams, and all channel streams can be represented by datastreams.

Referring now to FIG. 5, there is shown a block diagram for generating the channel stream from the datastream. In this regard, the datastream is viewed as a codestream which is arriving at the data in a buffer 13, most significant bits first. The mapping of the datastreams into counterpart (d,k) RLL streams is accomplished by an arithmetic expansion (arithmetic decoder) 15 in feedback relation with an FSM, representing the channel state 17. More particularly, the output of arithmetic expansion 15 is applied to FSM 17 over path 14. The channel state is communicated to the expansion network 15 over path 35. FSM 17 is initialized to its first state, and the arithmetic expansion unit 15 acts upon the data and the channel state to generate a stream of RLL symbols. The data out buffer 16 can parse the RLL stream in order to convert the symbols to the requirements of the particular recording channel path 5. The channel symbols emitted by arithmetic expansion unit 15 are fed to FSM 17. FSM 17, in turn, acts upon the new symbol and the current state to furnish the arithmetic expansion unit with the next state over path 39. Included within the arithmetic expansion unit are means for performing the special double recursions prescribed for arithmetic decoding as set forth in the Martin application. Thus unit 15 is capable of updating internal variables, determining augend factors, shifting in data bits as needed, and shifting out a channel symbol at the completion of a decoding recursion.

Referring now to FIG. 6, there is shown a general block diagram for datastream recovery from a (d,k) RLL symbol stream from path 7. A local buffer 23 converts the channel phenomenon to be parsed or unparsed so as to be understood by the arithmetic compression unit 31. The RLL symbols are simultaneously applied to FSM 17 and compressor 31 over path 25. FSM 17 supplies a state to compressor 31 over path 29. The shortened output of compressor 31 is applied to a data out buffer 35 over path 33.

Referring now to FIG. 7, there is shown an augend memory with channel FSM handling recursion. In the manner of Martin, the value NST and NX are stored in registers. During the recovery of the datastream from the channel stream, NST and NX serve as the next values of the state and x respectively. However the channel stream generation process is one which must locate the channel symbol which "works" so that the next NST and NX values from a trial channel set symbol need not become the next state or x value. In this version, x, the symbol, and state are register stored. They are used to access memory 37, whereas the NST, NX are register output with the values of SA and M respectively placed on paths 43 and 39.

RLL Codestream Generation

Referring now to FIG. 8, there is shown the data flow for channel stream (RLL generation). A bit stream from data buffer 13 is applied to the arithmetic expansion network 15 over path 21. This terminates in shift network 55. The other shifter output is provided by the n-bit resulting from subtractor 49 over path 53. Subtractor 49 yields the magnitude difference between the F register contents 45 and the augend M obtained from memory 37 over path 39. Apart from an initial datastream fed into F register 45, the contents of F buffer 47, which hold shifter 55 output, are used to supply the F register. The channel symbol output is taken to be the borrow signal from subtractor 49 over path 51.

Operationally, register F contains the "working end" of the datastream. For augend values of M, being 3, 4 or 5, then register F size can be 3 bits. This register is initialized with the leading 3 bits of the datastream, which causes the channel stream to be generated.

To start, expander 15 is set at an initial state, say $S_O$, with an initial retained fraction $x=0$. From the initialized state, the symbol generated, for example "A", and its duration d(A), will govern the next state and the next retained fraction.

In order to generate the RLL stream, there first must be determined the largest augend M(s,x,a), given $S_O$ and $x=0$, which does not exceed the value in the F register. The symbol "A" corresponding to this value of M(s,x,a) is the next channel symbol generated. Reiteratively, the augend of the counterpart channel symbols are examined until the first augend which is too large is identified. As may be recalled, an incremental register symbol in FIG. 7 is loaded with the second symbol value $A_2$. Further recalling that the augend corresponding to the first symbol is always zero, then a counter value of "0" can correspond to the address value associated with the second symbol. Values of state S and x, and the symbol, specify a table address in FIG. 7. These are used to retrieve $M(1,O,A_2)$ and output its contents on bus 39, and apply it to the subtrahend input of subtractor 49. The difference between the F register 45 contents and that of M is outputted on path 53 and shifted left in the shift unit 55. The amount of the shift is the value of control field Sa, also obtained from memory 37 in FIG. 7, and applied to the shifter over path 43. The "fill" bits for the shift are provided by the leading bits of the input bus over path 21. The results of the shift are stored in register 47.

The borrow signal on path 51 controls the outcome of the test subtraction. If M is less than F, the borrow signal is inactive and no channel (RLL) symbol is generated. The F register, the state register, and x registers remain unchanged by not clocking in a new value. However, the F buffer, the NST, and NX registers receive new values. The symbol counter is incremented and another magnitude comparison is made.

When sum symbol "A" first activates the borrow signal on path 51, then symbol "A−1" is placed on channel path out 14 through a control unit. Also, a next state, and next retained fraction for "A−1" are already placed in registers NST, and NX, respectively. These have been accessed on a previous cycle. Further, the new value for the F register is obtained from F buffer where it was stored on the previous cycle. There are now new values present in F, state, and x registers. The symbol register is loaded with "0" again, representing "A", and the trial subtraction cycle begins again.

Datastream Recovery From the RLL Codestream

Referring now to FIG. 9, there is shown the data flow from the datastream recovery from data compression unit 31. The unit includes an adder 59 for combining F register 57 contents with the magnitude M bus 29. The sum, together with a carry output, is sent over path 33 to data out buffer 16. The sum, absent the carry, is also sent to shifter 61. The shift amount SA from FIG. 7 controls the shift of shifter 61 as well as the output buffer 16.

The working end (write end) of the datastream appears in register F. The augend retrieved from the table is added to F through adder 59. The adder output is the sum F plus the augend. As mentioned, following the add operation, the output bits are passed to buffer 35. This buffer propagates the carry and manages the variable length field from the bus 33 over control line 43 (SA).

FIGS. 10 and 11 depict the next state functions, and an implementation of the next x, shift amount, and augend M driven by the outputs of FIG. 9. These are described in an illustrative (5,12) RLL code in the copending Martin case.

Modifications to the Finite State Table Description (FSTD) in the Martin Case

The point which must now be established is to alter the behavior of a Martin-type arithmetic RLL encoder and decoder so as to assure generation of an RLL codestream having spectral notches, and preserving the (d,k) properties.

In a subsequent discussion, a finite state transition diagram is used to model the generation of RLL codestream which preserves both the notch property and (d,k) constraints. This model is embodied first as a new use of the Martin encoder, and as an alternative functional APL language processor equivalent executing on an IBM 3033 processor.

Figure 13:
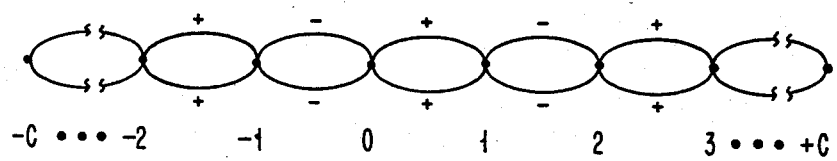
Figure 14:
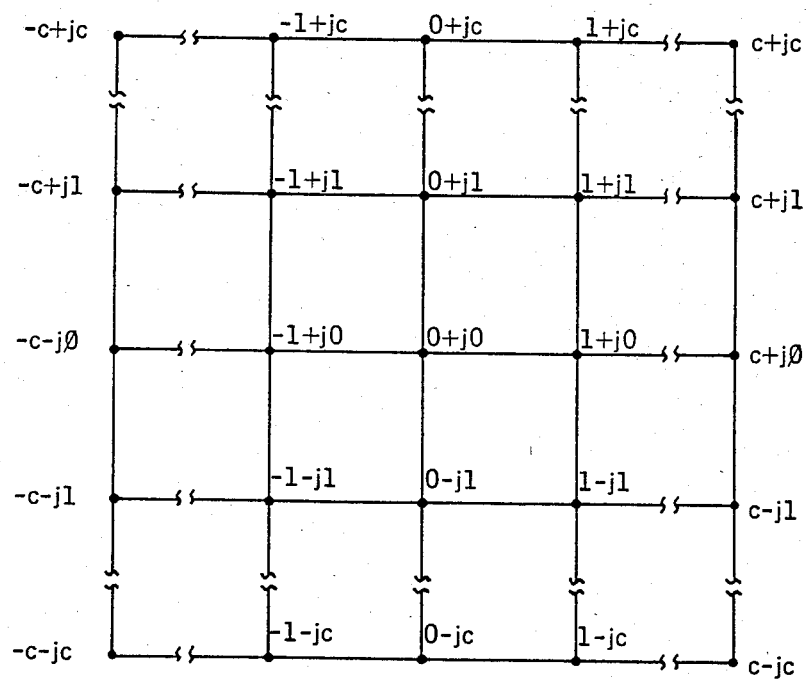

Referring now to FIG. 13, there is shown a finite state transition diagram for generating codestreams with an F/2 notch corresponding to the bound on a discrete Fourier transform (DFT) component at frequency f/2. The states represent the possible values of the running sum for DFT (f/2). Likewise, the square plane lattice in FIG. 14 is an FSTD for generating codestreams with a notch at f/4. This is an FSTD model for two-way interleaving. That is, a notch at f/4 was produced by bounding DFT (f/4) formed from two interleaved codestreams each with a notch at f/2. Since the square lattice of FIG. 14 may be viewed as two orthogonally coupled, or interleaved, FSTDs for an f/2 notch, like that of FIG. 13, it is easily extendable to the k dimensional case. In this regard, a k dimensional hypercube lattice, consisting of points with integer coordinates in Euclidian k-space, and with transitions appropriately labeled, is equivalent to k orthogonally coupled or interleaved FSTDs. This will therefore generate codestreams with a notch at f/2k. It is true that for the k dimensional case, other than for k=2, a codestream with a bounded DFT (f/2k) does not consist of k interleaved codestreams with bounded DFT (f/2), however, the k-way interleaving of f/2 notch codes will always produce a notch at DFT (f/2k).

The states at any k dimensional lattice are labeled by integer k vectors $(n_1, n_2 \ldots n_k)$. The jth component of such a vector tracks the value of the DFT (f/2) for the jth interleaved codestream. It is desired, of course, to have the transitions independent of the position of the corresponding symbol in the codestream. It is thus desirable to define a normalized transition. Thus, for the transitions +1 and −1:

| Symbol | Transition |
|---|---|
| +1 | $(n_1, n_2, \ldots, n_k) \rightarrow (n_2, n_3, \ldots, n_k, - (n_1 + 1))$ |
| −1 | $(n_1, n_2, \ldots, n_k) \rightarrow (n_2, n_3, \ldots, n_k, - (n_1 - 1))$ |

This normalization rule decomposes a hypercube lattice into multiple disjoint FSTDs. For example, a three-dimensional lattice for an f/6 notch is partitionable into two diagrams while a four-dimensional lattice can be partitioned into the same. Similarly, a five-dimensional lattice produces four FSTDs. This decomposition assists in selecting an FSTD with a minimum number of states. Parenthetically, when using an FSTD with extended symbols corresponding to run lengths, a "charge normalization" is built into the extended symbol transition. That is, the transition corresponding to the extended symbol consisting of a run of j zeros followed by a 1 is given by the rule of (A) performing (j+1) successive +1 transitions followed by a negation of all the coordinates of the final state.

Figure 15:
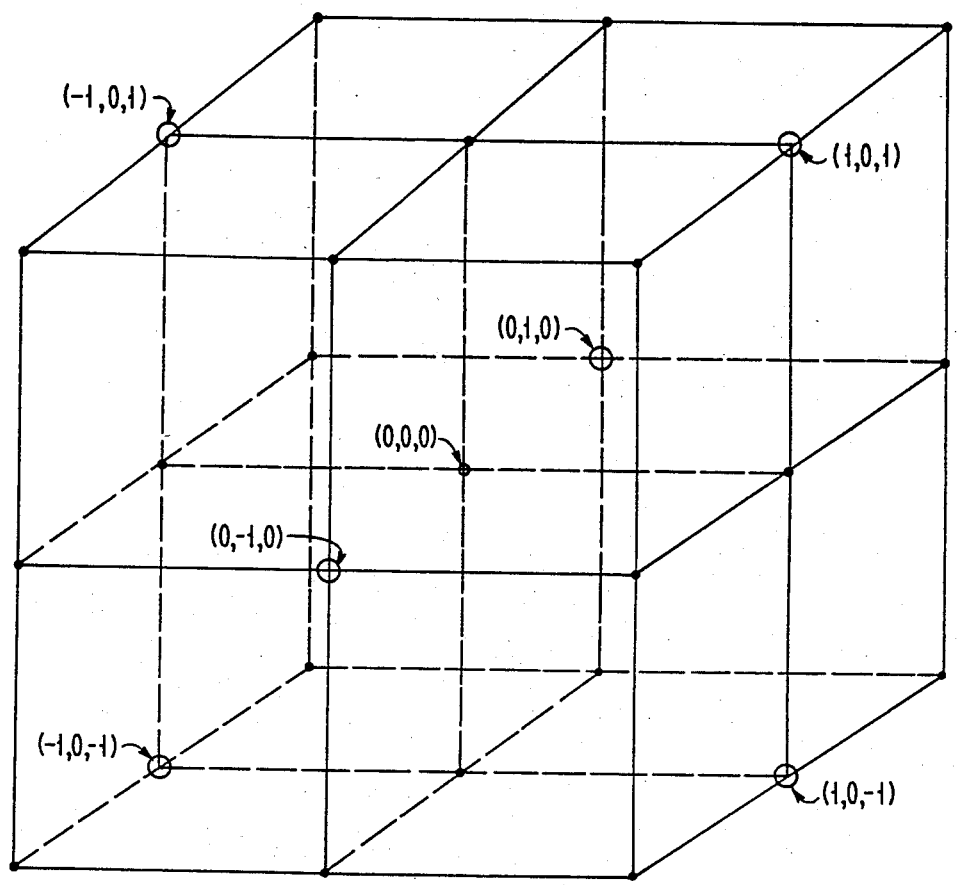
Figure 19:
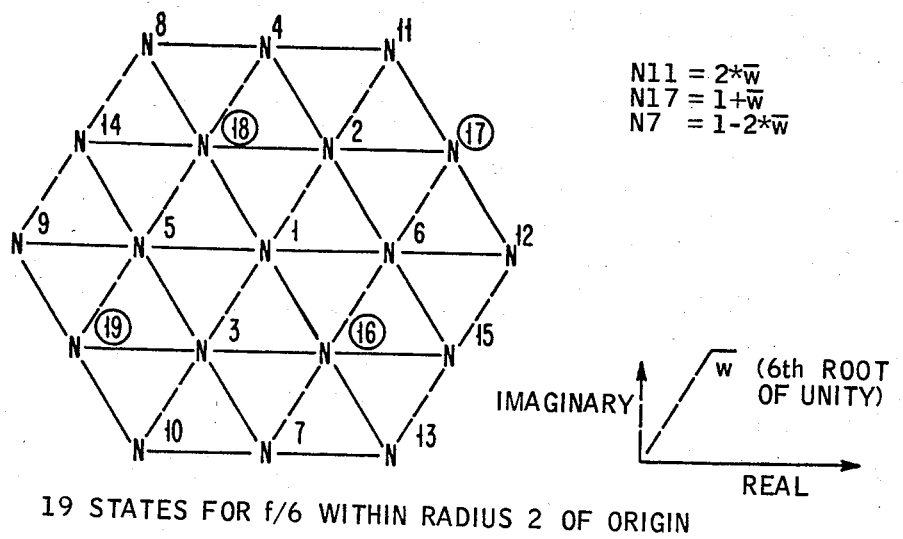

Referring now to FIG. 15, there is shown a three-dimensional cube lattice with coordinate bound C=1. The states belong to 2 disjoint FSTDs and the transition matrix for 6 state FSTD is given in FIG. 16. Illustratively, the transition matrix for a (2,7) code with f/6 notch, based on a fixed state FSTD is shown in FIG. 17 along with the transition matrix that results from identifying states 1 and 5 and states 3 and 6.

Figure 20:
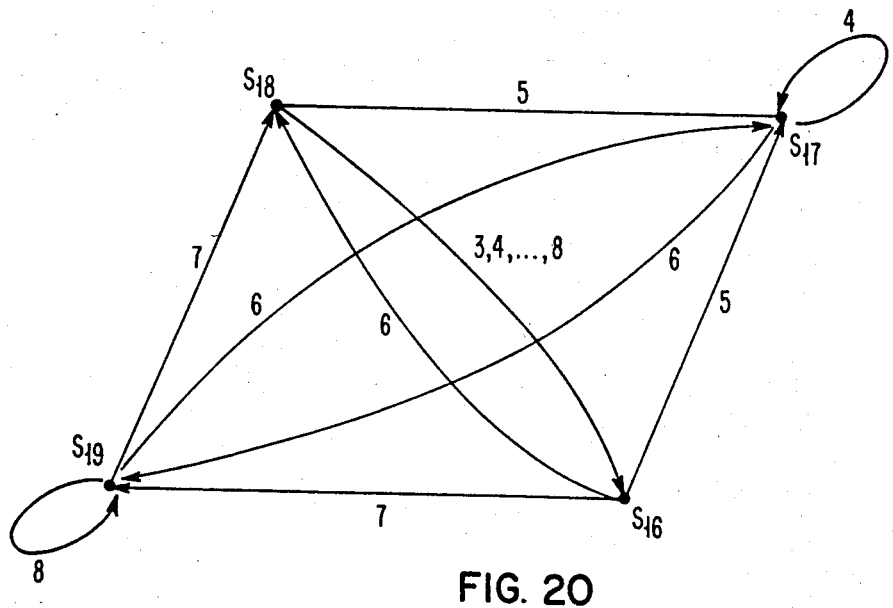

Referring now to FIG. 20, there is shown an FSTD model for a reduced set of 4 states (states labeled 16, 17, 18 and 19). The transitions produce extended symbols having run lengths of 3, 4, ..., 8. The transitions correspond to runs which begin and end at one of the four states. FIG. 20 shows 15 transitions altogether. Using a theorum from Shannon, "A Mathematical Theory of Communication", Bell System Technical Journal, Vol. 27, July 1948, at pp 379-423, computation is then made of the maximum code rate or capacity c, and the Eigenvector b. This computation is shown at the top of FIG. 21. The implementation efficiency of the rate $\frac{1}{2}$ code is ($\frac{1}{2}$)/c or greater than 99.5%. Following the teachings of the copending Martin application, the modified transition matrix TST and matrix MJX of addends, are also shown in FIG. 21.

Next there is described the channel coder and decoder algorithms for generalized run length limited codes. The hardware described can implement any FSM for which there is at most one symbol of a given length from a given state as previously set out. The encoder generates a channel stream as a sequence of sumbols 0 and 1. The unique symbol of length n+1 from state s is generated as n Os followed by one 1. The discussion of the coder and the decoder algorithms is followed by techniques for ascertaining table size and values.

The Channel Encoder Algorithm

The channel coder consists of the following:
Four registers:
  s (about 4 bits)
  n (about 4 bits)
  F (about 10 bits)
  X (about 2 bits)
Two constants: N, C (about 3 bits each)
Two ROM arrays:
  T*(s,n) (about 16*16*4 bits)
  m(s,X) (about 16*4*8 bits)
s is set by table lookup from T*.
n is set by addition of 1, or setting to 0.
F is set by subtraction of a value from m, and by shifting.
X is set by addition of constant N modulo constant C.

The coder generates one channel bit for each major iteration. It consumes one source bit synchronously for C of each N iterations. The coder algorithm is as below:
Step 1 Initialize register F with the leading |F| bits of source data. Initialize X=N, s=1, n=0.
Step 2 Check for end of source data. If yes, go to 6.
Step 3 Compare F with m(T*(s,n),X). If F≧m(T*(s,n),X) then
  output 0
  F=F−m(T*(s,n),X)
  n=n+1
  else
  output 1
  s=T*(s,n)
  n=0
Step 4 Add N to X mod C. If there is a carry, shift F left one bit, and shift the next bit of source data into the right of F. (n.b., The bit shifted out of F will always be 0.) This addition may be carried out using an adder. Alternatively, as this step proceeds independently from the data values, a shift register may be preprogrammed with X and carry values.
Step 5 Go to step 4.
Step 6 Handle end of source data.

One option is to let the coder run for additional cycles until it has consumed Q dummy bits of source. These bits are set to 1. Q is code-dependent.

The Channel Decoder Algorithm

The channel decoder has the same registers as the encoder. It consumes one channel bit for each major iteration. It generates one tentative reconstructed source bit at the rate of N for each C iterations. With the algorithm as we describe it here, the reconstructed source must be buffered to handle certain overflows.

The decoder algorithm is as follows:
Step 1 Initialize F=0, X=N, s=1, n=0.
Step 2 Check for end of channel data. If yes, go to step 6.
Step 3 Read next channel bit. If 0 then
  F=F+m(T*(s,n),X)
  n=n+1
  else
  s=T*(s,n)
  n=0
An overflow may occur in the addition to F. In this case, 1 is added to the rightmost bit of the tentative reconstructed source. This addition may cause propagation up to the top of this stream.
Step 4 Add N to X mod C. If there is a carry, shift F left one bit, introducing a 0 in the right. The leftmost bit shifted out is concatenated to the right of the reconstructed source.
Step 5 Go to step 2.
Step 6 Handle and effect in a way compatible with the decoder. For the method described above, decode until the end of channel stream is reached, and ignore the trailing Q bits of reconstructed source.

Sizes of Registers and Tables

Sizes of the registers and tables depend on the code to be implemented. Let the FSM defining the model have S states, and longest symbol of length k.

N/C is a rational approximation from below to the rate W of the code. The sizes needed for N and C depend on this approximation.

s must be large enough to define the states 1≦s≦S.

n must be large enough to described symbol length so far, 0≦n≦k.

T* has s×k entries, each large enough to hold next state j, 0≦j≦S.

X must be large enough to hold 0≦X<C.

m requires (S+1)*C entries: each requires approximately −log 2[((log W)−N/C)/log W] bits, where the number in square brackets is the inefficiency of the approximately N/C to W.

F requires approximately 2 more bits than m.

As an example, consider a charge-constrained (2,7,8) code. There are 14 states (s=14), so register s has 4 bits. The maximum symbol length is 8, so register k is 4 bits. Table T* has 14×8 entries, each of 4 bits. Rate N/C is ½, so register X is one bit. Growth rate W is 1.415 so channel capacity log W is 0.501 information bits per channel time unit. The inefficiency is ≈0.001/0.5 or 0.002. Register F should therefore have about 9+2=11 bits.

Formulating the Table Entries

The table lookup table is composed of the following steps. The table entries are based on data from the given (parsed form) FSM. Computation of m involves experimental iteration on a value "scale".

Computation of T*

$T^*(s,n) = T(s,a)$, where there is a symbol a of length $n+1$ from state s.
$= 0$, otherwise

Computation of m

1. Choose some scale factor "scale".
2. Set $m(j,X) = \lfloor scale \cdot B_j \cdot 2^{-X/C} \rfloor$. (4.1)
3. Check the consistency of these values for m. We wish:

$$m(j,X) \leq \sum_a m(T(j,a),(Nxl(a) + X) \bmod C) \quad (4.2)$$

$$x2^{-(Nxl(a)+X)/C}$$

where a ranges over all phrases in the parsing FSM alphabet.

If the check succeeds for all j, X, we are done. If not, we retry with a larger scale. Theory tell us that this iteration will terminate for "scale" sufficiently large.

The iteration to find m may be modified with the aim of finding a set of smaller values of m following the techniques of Todd and Langdon [7].

EXAMPLE

Consider the finite state machine with four states 1, 2, 3, and 4; and three symbols, a, b, and c of length 2, 3, and 4 respectively. The transformations are given in:

|  |  | to state T (j,a) | | | |
| --- | --- | --- | --- | --- | --- |
|  |  | 1 | 2 | 3 | 4 |
| from state j | 1 | — | a | b | c |
|  | 2 | a | — | c | b |
|  | 3 | — | b | a | — |
|  | 4 | a | b | c | — |

Next, a rate is computed and the eigenvector components are ascertained:

W = 1.42065, rate = 0.50655
B(1) = 1.00000
B(2) = 1.01680
B(3) = 0.70289
B(4) = 1.02266

Given this rate, we choose N=1 and C=2.

The values for m are now calculated from Eq. 4.1, and the "check" from Eq. 4.2. With scale=32, the following is obtained:

| j | X | m | check |
| --- | --- | --- | --- |
| 1 | 0 | 32 | 31.5* |
| 1 | 1 | 22 | 22.75 |
| 2 | 0 | 32 | 32.5 |
| 2 | 1 | 32 | 24.75* |
| 3 | 0 | 22 | 22.5 |
| 3 | 1 | 15 | 15.5 |
| 4 | 0 | 32 | 33 |
| 4 | 1 | 23 | 24.75* |

For the next trial assume Martin inequality equation fails for 3 values of m.
scale = 64 to get:

| j | X | m | check |
| --- | --- | --- | --- |
| 1 | 0 | 64 | 64.25 |
| 1 | 1 | 45 | 45.5 |
| 2 | 0 | 65 | 65.5 |
| 2 | 1 | 46 | 46.25 |
| 3 | 0 | 44 | 45 |
| 3 | 1 | 31 | 31.75 |
| 4 | 0 | 65 | 66 |
| 4 | 1 | 46 | 46.5 |

Method Executable on an APL Language Processor and Equivalents

Figure 12:
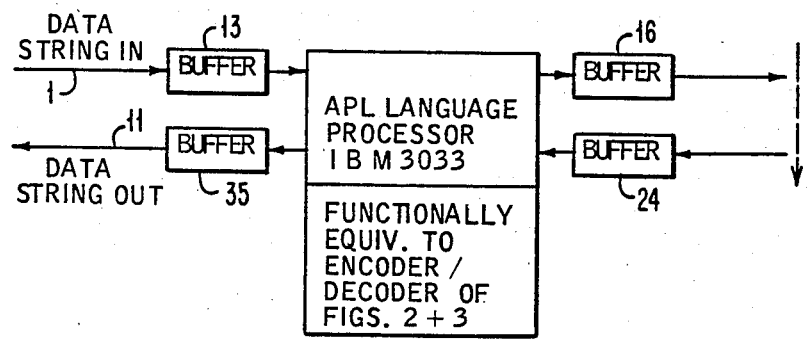
FIG. 12 shows an APL language processor executing on an IBM 3033 an alternate embodiment to, and functional equivalent of, the embodiment shown in FIGS. 4-11.

Referring now to FIG. 12, there is shown an APL language processor executable on an IBM 3033, or equivalent, interposed between suitable buffered input original data streams for expansion and recording upon a medium, and expanded data streams from which original data will be extracted. In this embodiment, the invention has been implemented on an IBM 370/3033 CPU for running under an APL interpreter defined by the APL Language Processor, Release No. 3, published in the IBM manual No. GC26-2847, 5th Edition, 1978. In this new machine use, a binary datastream vector labeled "DATA" is processed by an encoder to produce an expanded RLL bit stream vector called "CDATA" exemplifying frequency notching and (d,k) constraints. Both tables MJX and TST are utilized. A second process named decode transforms the vector CDATA into the original data vector, also utilizing the tables TST and MJX.

The operating system of the IBM 3033 conforms to the IBM 370 system architecture. This is described in Amdahl, U.S. Pat. No. 3,226,689, and in publication "IBM Systems/370 Principles of Operation", A22-7000-4. Relatedly, reference can be made to Casey et al, U.S. Pat. No. 4,181,952, issued Jan. 1, 1980, which describes a machine-implementable method also running upon IBM's System 370, having a resident APL/360 interpreter described in IBM publication LY20-2678, entitled "APL/360-OS and APL/360-DOS System Manual", published in February 1975. Another CPU capable of directly executing APL statements is the IBM 5100 containing an APL interpreter and firmware. This is described in IBM 5100 Math/APL User's Guide, First Edition, August 1975, in publication 5721-XM2. Although one embodiment of this invention has used APL source/interpretive code, compilable language functional equivalents to an interpreting language may be made absent undue experiment. Reference should be made to Minsky, "Computation-Finite and Infinite Machines", Prentiss-Hall, 1967, pp107–114, especially at page 108.

Two commercially availabe APL language systems for executing the invention upon microprocessors include APL/V80 Release 4.0 by Vanguard Systems Corporation, 6901 Blanco Road, San Antonio, Tex. 78216, for execution on a Z80 Microsoft card running on the CPM operating system as installed in an Apple II plus computing system. Alternatively, the Waterloo APL Language Processor, running on the Motorola 68000 microprocessor in the Commodore Superpet computer, and in the IBM Personal Computer, can implement the invention. Both the Vanguard and the Waterloo APL language processors emulate the IBM APL SV language product.

It is a necessary paradigm to recall that the RLL encoder treats the datastream as if it were already arithmetically compressed information, i.e., a sum. Expansion consists therefore of subtracting and shifting predetermined amounts from the datastream, which is then either transmitted or recorded. In order to recover the expanded information, the RLL stream is applied to an arithmetic encoder which compresses information by adding all the subtracted numbers back in order to recreate the original datastream. Parenthetically, the APL RLL encoder/decoder sequences of FIGS. 22 and 23, require two tables and one register as global variables. More particularly, MJX is a table of M addend values, while TST is the modified transition matrix and LREC is the shift register length index. The local variables include the original bit stream DATA; rational numbers N,C representing the fixed rate; a run length counter K; and table lookups from TST.

Referring now to FIG. 22, there is shown the APL sequence for the encoder for the (2,7) RLL code with a spectral notch at f/6. The fixed rate is set at n=1 and c=3. The data is embedded within LREG zeros and LREG ones in line [20]. The encoded output CDATA is initialized to an empty vector in line [21]. Note that counter K and register TOTSHIFT are initialized to zero at [17] and [22] respectively.

To facilitate APL processing, the input binary vector DATA is converted to decimal and assigned to internal variable F in line [26]. This is followed by the principal encoder test which occurs in line [28]. This is a conditional branch which ascertains whether the first LREG bits in internal variable F are less than a predetermined MJX table value. If this is true, a branch is made to a label ONE: on line [35]. Otherwise, processing continues on line [29] where a zero is appended to the vector CDATA. The data vector on line [31] is then adjusted by subtracting out the table value MJX from the internal variable F. On the very next line [32], the RLL counter K is incremented by +1. After this, an unconditional branch to the label ADDX: on line [44] is made.

Returning to the conditional branching statement on [28], if the internal variable F is less than the MJX table value, and upon a branch being made to label ONE on line [35], then a binary one is appended to the output vector CDATA on [37]. Variable F is then assigned a predetermined value from table TST at address [(1+S);(1+K)]. Since a 1 has been appended to CDATA, counter K is preset to 0 at [40].

The sequence identified by ADDX: runs from lines [44] to [52]. In this case c is equal to 3. The shift amount is the floor of (x+n)/c on [64]. The shift is either a 0 or a 1. To ascertain the retained fraction, x is calculated from (x+n) modulo c, where c=3. Next, the data is shifted by the shift amount on line [68]. Afterwards, the total shift is incremented by the shift amount on line [71]. Lastly, another cycle of encoding is invoked by branching to the label ZERO if the accumulated shifting magnitude is less than the datastream length minus LREG when the statement on line [72] is executed.

There are numerous output formatting statements which are only of display interest. These are on lines [15], [23], [30], [38], [45], [49], [50].

Referring now to FIG. 23, there is shown the decode function in which the data vector DATA is recovered from the vector CDATA. The local and global variables are initialized as in the encode function. Since the vector DATA is the output of the decoder, it is initialized to an empty vector $\phi$ on line [9]. The statement of first importance is the conditional branch on line [15], in which a jump is made to label ONE: on line [26] if the leftmost bit of CDATA [1] is not equal to zero. Otherwise, the internal variable F is incremented by a predetermined quantity from table MJX on [16]. This is used to recreate datastream magnitude. Next, overflow is checked on line [19]. Overflow is tested by the conditional branch statement on line [19]. A carry would propagate beyond the length of F, and hence not be equal to 0. A contingency to manage register overflow and propagate a carry to at least twice the register extent, is managed at line [21]. If there is no overflow, a branch is made to label INCK: at line [22]. At this point, counter k is incremented by +1 at [38], and a branch is made to label ADDX: at [33]. The recreation of the original data involves adding numbers originally subtracted out, to the datastream. This first involves determining a sift amount at [35], and appending the next bit of the internal variable F by shifting left by the shift amount to the DATA vector at [37]. Next, F is shifted left by the shift amount where a rightmost 0 is appended at [38]. The input vector CDATA is shifted by one bit position at [63]. At this point the TOTSHIFT is incremented by +1. Another iteration is invoked by a conditional branch to label ZERO: if TOTSHIFT is less than the length of vector CDATA. Termination of the process involves truncating the leading zeros and trailing a dummy bit from the output vector DATA.

It is to be understood that the particular embodiments of the invention described above and shown in the drawings are merely illustrative and not restrictive of the broad invention. For example, a notch frequency in a spectrum can be produced by k-way interleaving, although destroying channel (d,k) coding constraints. This, however, can be met by modifying a Martin channel coder with a FSTD lattice diagram with transitions labeled with multi-bit code symbols, satisfying both the (d,k) constraint and notching at an appropriate frequency.

We claim:

1. A method for frequency band limited encoding of a datastream such that the encoded representation exhibits a spectrum notched at selected frequencies within the band, comprising the steps of:

forming a concordance of selected state transitions of a lattice-type finite state transition encoding space with selected run length limited (RLL) encoded symbols such that any succession of transitions is well correlated with an RLL symbol stream, the spectrum of the NRZ representation of each RLL stream being notched at the selected frequencies;

one-to-one mapping of each datastream into an RLL symbol stream by fixed rate length-oriented recursive arithmetic encoding of ssaid datastream according to the concordance; and transforming each mapped RLL symbol stream into an NRZ representation.

2. A method according to claim 1, wherein each of the elements of the datastream assumes one of two ($-1$, $+1$) magnitude values.

3. A method for converting a data symbol stream, each symbol of which occurring at clocking frequency f into an NRZ representation of a fixed rate run length limited (RLL) symbol stream, said NRZ representation spectrum being notchable at $f/2k$, $k=1,2,\ldots$, comprising the steps of:

forming and storing a state transition table, each transition being labeled with an RLL symbol, a shift amount (SA) and a trial augend (TA), the RLL symbols for each transition vector being selected so as to preserve a notch in the NRZ representation at $f/2k$;

encoding each RLL symbol by selecting a TA and SA from the table as indicated by the last encoded RLL symbol and state transition; and cyclically comparing the datastream and TA digits in high to low magnitude order, and relatively shifting the stream by SA in a direction minimizing the difference until TA is greater than the datastream magnitude.

4. A method according to claim 3, wherein each data symbol assumes one of two ($-1$, $+1$) magnitude values.

* * * * *